(12) United States Patent
Goffart et al.

(10) Patent No.: US 10,866,779 B2
(45) Date of Patent: Dec. 15, 2020

(54) USER INTERACTIVE DISPLAY DEVICE AND OPERATING DEVICE

(71) Applicant: Bayerische Motoren Werke Aktiengesellschaft, Munich (DE)

(72) Inventors: Klaus Goffart, Munich (DE); Dominik Gusenbauer, Seattle, WA (US); Thomas Mangel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/013,076

(22) Filed: Jun. 20, 2018

(65) Prior Publication Data

US 2018/0300095 A1 Oct. 18, 2018

Related U.S. Application Data

(63) Continuation of application No. PCT/EP2016/081131, filed on Dec. 15, 2016.

(30) Foreign Application Priority Data

Dec. 21, 2015 (DE) .................. 10 2015 226 153

(51) Int. Cl.
| | | |
|---|---|---|
| G06F 3/147 | (2006.01) | |
| G06T 7/70 | (2017.01) | |
| G06K 9/00 | (2006.01) | |
| G06F 3/01 | (2006.01) | |
| G06T 11/00 | (2006.01) | |

(52) U.S. Cl.
CPC .............. *G06F 3/147* (2013.01); *G06F 3/017* (2013.01); *G06K 9/00362* (2013.01); *G06T 7/70* (2017.01); *G06T 11/00* (2013.01)

(58) Field of Classification Search
None
See application file for complete search history.

(56) References Cited

U.S. PATENT DOCUMENTS

| 2003/0101105 A1 | 5/2003 | Vock |
|---|---|---|
| 2004/0098137 A1 | 5/2004 | Hollemans |

(Continued)

FOREIGN PATENT DOCUMENTS

| CN | 102201099 A | 9/2011 |
|---|---|---|
| CN | 104272371 A | 1/2015 |

(Continued)

OTHER PUBLICATIONS

Matthias Straka, Stefan Hauswiesner, Matthias Ruther, Horst Bischof, A Free-Viewpoing Virtual Mirror with Marker-Less User Interaction, May 2011, 17th Scandinavian Conference on Image Analysis (SCIA) 2011, LNCS 6688, pp. 635-645 (Year: 2011).*

(Continued)

*Primary Examiner* — Michael J Cobb
(74) *Attorney, Agent, or Firm* — Crowell & Moring LLP (57) ABSTRACT

A display device has an electronically controllable display element for graphical display, a mirror unit which displays, in mirror image, an object located in a predefined region of the environment of the display device, a sensor which detects the position of the object within the predefined region, and a control unit which controls the position of at least one graphical element on the display element on the basis of the detected position of the object.

8 Claims, 3 Drawing Sheets

(56) References Cited

U.S. PATENT DOCUMENTS

| | | |
|---|---|---|
| 2005/0018140 A1 | 1/2005 | Ishizaki et al. |
| 2007/0124694 A1 | 5/2007 | Van De Sluis et al. |
| 2009/0059175 A1 | 3/2009 | Le Quesne et al. |
| 2011/0056102 A1 | 3/2011 | Reid et al. |
| 2011/0246329 A1* | 10/2011 | Geisner .................. G06F 3/017 705/27.1 |
| 2012/0113223 A1 | 5/2012 | Hilliges et al. |
| 2013/0145272 A1 | 6/2013 | Boggie et al. |
| 2013/0211623 A1 | 8/2013 | Thompson et al. |
| 2013/0265232 A1 | 10/2013 | Yun et al. |
| 2014/0012498 A1 | 1/2014 | Gustafson et al. |
| 2016/0026255 A1* | 1/2016 | Katz .................. H04N 5/23222 345/156 |
| 2016/0171201 A1 | 6/2016 | Schroeder |
| 2016/0179205 A1* | 6/2016 | Katz ....................... G06F 3/013 345/156 |
| 2018/0292907 A1* | 10/2018 | Katz ....................... G06F 3/017 |
| 2020/0142495 A1* | 5/2020 | Steinberg ........... G06K 9/00355 |
| 2020/0301562 A1* | 9/2020 | Gupta ................. G06F 3/04815 |

FOREIGN PATENT DOCUMENTS

| | | |
|---|---|---|
| DE | 102 48 296 A1 | 5/2004 |
| DE | 10 2011 053 112 A1 | 2/2013 |
| DE | 10 2013 012 339 A1 | 1/2015 |
| KR | 10-2008-0065032 A | 7/2008 |
| WO | WO 2013/180651 A1 | 12/2013 |
| WO | WO 2016/135183 A1 | 9/2016 |

OTHER PUBLICATIONS

International Search Report (PCT/ISA/210) issued in PCT Application No. PCT/EP2016/081130 dated Mar. 13, 2017 with English translation (five pages).

German-language Written Opinion (PCT/ISA/237) ) issued in PCT Application No. PCT/EP2016/081130 dated Mar. 13, 2017 (five pages).

German-language Search Report issued in counterpart German Application No. 10 2015 226 152.2 dated Apr. 21, 2016 with partial English translation (13 pages).

International Search Report (PCT/ISA/210) issued in PCT Application No. PCT/EP2016/081131 dated Mar. 3, 2017 with English translation (five pages).

German-language Written Opinion (PCT/ISA/237) issued in PCT Application No. PCT/EP2016/081131 dated Mar. 3, 2017 (seven pages).

German-language Search Report issued in counterpart German Application No. 10 2015 226 153.0 dated Sep. 29, 2016 with partial English translation (14 pages).

English translation of Chinese Office Action issued in Chinese Application No. 201680074816.6 dated Aug. 13, 2020 (eight (8) pages).

\* cited by examiner

USER INTERACTIVE DISPLAY DEVICE AND OPERATING DEVICE

CROSS REFERENCE TO RELATED APPLICATIONS

This application is a continuation of PCT International Application No. PCT/EP2016/081131, filed Dec. 15, 2016, which claims priority under 35 U.S.C. § 119 from German Patent Application No. 10 2015 226 153.0, filed Dec. 21, 2015, the entire disclosures of which are herein expressly incorporated by reference.

This application contains subject matter related to U.S. application Ser. No. 16/013,125, entitled "Display Device and Method for Controlling a Display Device" filed on Jun. 20, 2018.

BACKGROUND AND SUMMARY OF THE INVENTION

The invention relates to a display apparatus and to an operating device.

Known are display apparatuses in the form of mirrors, which comprise a mirror surface and an electronically actuable display element (display) which is arranged behind the mirror surface. Such a display apparatus is described, for example, in U.S. 2005/0018140 A1. Here, a corresponding display element is provided behind a semi-transparent (half) mirror. The semi-transparent mirror is provided in particular to show customers of a hair salon simulations of how a specific hair color changes their appearance. In a first operating mode of the mirror, the customers can view their original image, reflected at the mirror surface, in the form of a reflected image. In a second operating mode, they can furthermore see the overlaid, electronically produced image with a hair color that is to be respectively simulated, wherein other body parts of the person, which are recorded live using a camera, will also be displayed in electronically controlled fashion. In contrast, the electronic display element in the first operating mode is deactivated such that no image is displayed. In that case, the mirror acts as a conventional optical mirror. In the second operating mode, the display element is activated, wherein it lights up very brightly if the surrounding space is well illuminated. The superposition of the electronic image of the person, recorded using the camera, with the respective simulated image of the hair in a different color is controlled by way of an image processing processor.

WO 2013/180651 A1 discloses a corresponding mirror having an electronic display system, which is arranged behind a mirror surface of a semi-transparent mirror and by way of which additional, virtual objects can be electronically added to the reflected image of original objects. The semi-transparent mirror is partially transmissive and partially reflective for visible light or visible images.

Also known are display apparatuses that have an electronic mirror function and may also be referred to as electronic mirrors. Such a display apparatus is known for example from U.S. 2003/0101105 A1. The display apparatus is equipped with a camera which records objects that are located in front of the display apparatus, in particular a person wishing to view their reflected image. The recorded image of the object is then reproduced, corresponding to a natural reflected image, on a display element of the display apparatus such that the object is virtually mirrored in the display element by the observation position thereof. In the application cases in US 2003/0101105 A1, fitting rooms are simulated for people by combining or superposing image data of items of clothing, which image data are electronically provided, in a data processing process, with image data of the respective person that are recorded by the camera and then by presenting the processed image data on the display element.

According to U.S. 2003/0101105 A1, provision is furthermore made for the display of the respective items of clothing to be controlled using a computer that is connected to the Internet. A user can here select, via a computer-typical user interface, such as e.g. a keyboard or a mouse, images of the items of clothing from a database that is accessible via the Internet.

The contents of the above-mentioned publications are expressly incorporated by reference herein.

It is a first object of the invention to display additional information to a user of a mirror in an appropriate manner.

It is a second object of the invention to make a contribution for making available a graphical user interface for a user which permits easy and secure operation of electronically controlled devices.

At least one of said objects is achieved in each case by the invention stated in the independent claims. Advantageous embodiments of the invention are stated in the dependent claims.

According to a first aspect of the invention, a display apparatus is provided, which comprises:
- an electronically actuable display element for graphical displays,
- a mirror unit, by way of which an object that is located within a specified region of the environment of the display apparatus is presented in reflected form,
- a sensor, which captures the position of an object within the specified region, and
- a controller, which controls the position of at least one graphical element on the display element on the basis of the captured position of the object.

The controller can be here set up in particular such that, from the view of or from the viewing angle of the object, the displayed graphical element does not superpose with the displayed reflected image of the object. The object can in particular be a person using the display apparatus, i.e. a user.

According to the first aspect of the invention, it can be provided in particular for a display apparatus to comprise at least one mirror and an electronically actuable display element. The controller can here be set up such that at least one piece of information is displayed on the display element using the graphical element such that it does not superpose with the reflected image thereof from the view of the user of the display apparatus who is situated in front of it. The at least one graphical element is in that case an element that is not part of the reflected image of the object. The respective piece of information can be a piece of information mentioned in this document and can in particular be a piece of mobility information, which will be described further below. It may in particular be a piece of information which is not assigned to the object. It is in particular possible with such a display apparatus to allow adaptation of the image-wise presentation of the electronically displayed additional information to the silhouette of a user of the display apparatus that is visible in the reflected image such that no superposition, in particular no superposition which is disturbing for the user, of the respective images occurs. The reflected image of the object, in particular of a person, can thus be visible easily, completely and without disturbance. Depending on the position of the object in front of the display apparatus and possibly the viewing direction thereof, the controller is used to automatically adapt the position or presentation of the graphical element.

A graphical element in the present context can be understood to mean any element that is suitable for graphically presenting information, that is to say for example letters, numbers, tables, graphics, pictures etc.

The first aspect of the invention is based on the finding that first, a person looking at themselves in a mirror will perceive it as disturbing if superposed in their reflected image are other images or graphical elements that said person cannot associate with themselves or with their current motivation for viewing the reflected image. On the other hand, the person may wish for additional objects or information, which are possibly unconnected to the motivation for viewing their reflected image, to be overlaid in a mirror according to the invention using the display element, such that the mirror offers the added value of information.

For example, added value may arise for a person if that person is looking at themselves in the mirror in the hallway upon leaving their apartment to check the state of their clothes and at the same time has indicated to them in the mirror information corresponding to their subsequent mobility desire for reaching a target location, such as for example a recommendation pertaining to the prevailing traffic and/or weather situation for selecting a suitable means of transport (car, bus, train) and/or a corresponding driving route recommendation.

The mirror unit can comprise at least partially electronic components, for example an optical camera and an image processing processor which processes signals captured by the camera, wherein the display element is actuated using the processed signals. The mirror unit can in particular also comprise the display element itself. The mirror unit can correspondingly be designed at least partially as an electronic mirror.

The mirror unit can also be embodied at least partially as a conventional, optical, entirely or partially reflective mirror. The mirror unit can comprise at least partially an optical mirror at which light rays that are incident on a mirror surface of the mirror are at least partially reflected. The optical mirror can also be embodied as a semi-transparent mirror, and to this end has in particular a reflectance of at least 50%, in particular 70% to 90% for light rays that are incident on the mirror surface. Due to the semi-transparent mirror, display contents of the display element are thus also visible on the front side of the mirror.

The display element can be fixedly arranged in front of or behind the mirror surface and be in particular fixedly connected thereto. It can also be releasably connected thereto. It is also possible for it to be embedded in the mirror or in the mirror surface, for example to be integrated in the form of a laminate.

Provided by way of the mirror unit is in particular a mirror function for objects which are located in a specified region in the environment of the mirror. The mirror function comprises in particular effects of optical reflection which also occur in a natural reflected image. The specified region can be for example the detection region of a sensor, in particular of a camera of the display apparatus.

It is possible with the invention to display on the display element in particular additional information to the object that is presented in the reflected image, which additional information is assigned to the object or is not assigned to the object. An assigned piece of information can be e.g. the name of a person being imaged, who was recognized e.g. on the basis of the sensor signals and/or using a database. A non-assigned piece of information can be e.g. any information relating to the weather at a location that is specified but independent of the person.

It is possible by way of this additional information in particular to provide for a person using the display apparatus information-based added value pertaining to their current real surroundings, for example by way of weather statements. What is known as an augmented reality function can also be provided hereby.

The display apparatus can also comprise in particular a data interface, which is set up for retrieving and/or receiving mobility-related data from at least one data source. In accordance with this embodiment of the display apparatus, it is possible to provide for a user having a mobility requirement suitable, in particular selected, information in a manner which is specifically adapted to their current situation. This is possible in particular by providing mobility data using the data source. It is here furthermore advantageous to provide means, such as a sensor, with which it is recognized whether the person is about to travel to a different location, e.g. whether a mobility requirement exists. For this purpose, in particular a corresponding sensor and/or a corresponding communication link to at least one data source may be provided, from which the mobility requirement can be derived.

The display apparatus and in particular the mirror can be designed as a wall mirror and/or as a standing mirror in a suitable size and/or type of construction, for example having a width of 10 cm to 2 m and a height of 10 cm to 2 m, and/or with suitable holders, feet and/or wall attachment means, such that a user can see themselves in their reflected image with a suitable degree of detail or suitable size.

The mirror does not necessarily have to be planar and/or have a full-area design, and instead can also be designed as an at least partially curved and/or partially reflective piece.

The data source can comprise and possibly make available at least one type of the following data: data pertaining to at least one vehicle for private transport; data pertaining to means of public transport such as train, suburban train, underground, streetcar, wherein they can comprise current data such as departure time, arrival time, possible delays etc.; appointment details for one or more persons; geographic data or navigation data; data pertaining to a movement profile for at least one person; weather data.

The display apparatus can in particular be set up to recognize the detected object, and/or determine a silhouette of the object, based on data obtained using the sensor and/or at least one further sensor. For the recognition or the determination, a processor and computer program running thereon can furthermore be provided, which accesses stored data and/or parameters. Corresponding object recognition and/or image processing methods which are known per se can be used here, for example for recognizing geometric objects a Hough transform with a subsequent contrast analysis, a principal component analysis (PCA) for recognizing objects using vectors along the maximum variance, Fisher's discriminant analysis for recognizing faces and/or assigning object classes such as animals or human.

It is furthermore possible for processing the data to use a hidden Markov model (HMM) and possibly train it accordingly and/or to use a Bayes classifier. Neural structures in various forms can also be used in data processing to train a corresponding network which reacts to specific objects in the image.

The display apparatus can comprise a processor and computer program which is able to be executed or is executed on the processor and by which the respective method is performed for recognizing an object, for example a specific vehicle key, a specific person, a specific mobile radio device or a different, yet specific object. Provision may be made here for making the display dependent on, or triggering it in dependence on, a respective object, such as a key being located in a specified local region, for example in a specified key holder which may be mounted on the display apparatus.

In a further preferred exemplary embodiment of the invention, the display apparatus is set up to output control data to a personal means of transport, e.g. to a motor vehicle, and/or to an electrical controller. The controller can in particular be a component of the motor vehicle. The output can be made directly to the vehicle, e.g. by way of radio link. It can also be made indirectly via a communication system, such as what is referred to as a backend server, which exchanges data with a multiplicity of vehicles.

For outputting the control data, the display apparatus can in particular also comprise an interface for inputting commands or a corresponding operating device. The display apparatus to this end can in particular be embodied as a graphical user interface (GUI), in which an input is made via graphical buttons, and/or have electromechanical buttons. The display apparatus can to this end also have a touch-sensitive switch element, as is known for example from what are known as touchscreens. It is possible with such a display device in turn to control or operate other electronic controllers or devices or to provide input parameters.

For operation purposes, a camera system, in particular an optical and/or an IR camera, can also be provided. The corresponding operating device can comprise a controller which can also recognize for example gestures of the user, such as prescribed hand movement gestures. Using gestures, in particular intuitive control of the display on the display element is possible. The display element can in particular be an LED display.

In accordance with a second aspect of the invention, which can be used independently of or in combination with other aspects of the invention, a display apparatus is provided which comprises a sensor for capturing a user of the display apparatus in a specified region of the environment of the display apparatus, and an electronically actuable display element and a mirror element for displaying a reflected image of the user. The display apparatus is set up such that displayed on the display element is at least one graphical input element which at least partially overlaps and/or borders the reflected image.

Using the at least partially overlapping and/or bordering displayed graphical input element, it is advantageously possible to achieve operation of the display apparatus and/or of another control system by way of gestures. The input element can be for example a graphic or an image of a knob/pushbutton, as is nowadays sometimes provided in vehicles and is known, for example in BMW vehicles, by the name "iDrive Controller."

The input element can be displayed on the display element in particular such that it is overlaid for the user in their reflected image, for example on one of their hands as a virtual, graphical input element. Furthermore, the gestures of the respective hand of the user are captured by way of a suitable sensor system (e.g. an optical camera) and used for controlling a system. If a system of this type is provided within and/or outside of a vehicle, functions that have hitherto been capable of being operated by a user using an electromechanical knob/pushbutton within the vehicle can be operated using the displayed virtual knob/pushbutton from inside and/or outside the vehicle, wherein the user merely needs to perform hand gestures similar to, in particular the same as, e.g. rotating, pushing, tilting as in the case of mechanical operation. In particular a corresponding movement of the virtual knob/pushbutton is displayed on the display element.

It is possible with the second aspect of the invention in particular consequently to achieve a virtual reality function for a user of the display apparatus and to provide an intuitive mechanism for visual feedback for recognized gestures. With a display apparatus of this type, operation of the display apparatus itself and/or of controllers, items, devices etc., which are connected to the display apparatus by data-technological or signal-technological means, for example in wire-bound fashion and/or by way of wireless radio link, can be performed.

In accordance with a third aspect of the invention, which can be used independently of or in combination with the other aspects of the invention, provision is made for a fictitious graphical element, such as a fictitious line, to be displayed, in particular overlaid, on the display element of a corresponding display apparatus, which element extends, from the viewing angle or view of the user, from the reflected image of one of their body parts intended for operating a control system, for example from the reflected image of an operating hand or an operating finger, to a graphical operating element that is displayed on the display element, in particular to a selection field or virtual operating button.

In particular pointing or operating gestures can be made visually visible here and feedback which is easy to recognize can be provided for the user as to what their gesture at the virtual operating surface does, e.g. which virtual operating button it affects. In particular, the displayed line can be embodied such that it connects the respective body part that is performing the gesture to the respective display element.

Using the overlaid line and possible parameters of the line, such as the length, thickness, color or brightness thereof and/or of further graphical elements which can be dynamically displayed, it is also possible to visualize the progression of a respective gesture, for example a hand movement. If a hesitant pointing gesture begins, for example, it is presented by way of a short line or a short ray, which extends as the performance of the gesture continues, until finally the selected object is reached and the gesture is completed.

In addition, the distance of the respective body part performing the gesture from the display apparatus can be illustrated by way of properties of a graphical element, such as a cursor used as a symbol or an image which in particular represents or images the body part. The distance can be illustrated for example by way of the size and/or brightness thereof. The shorter the distance is, the larger and brighter is the display e.g. of the graphical element. Such a display or illustration can be advantageous independently of whether or not a perspective calculation of the optical-spatial relationships between object and display apparatus is performed.

It is possible with the third aspect of the invention to achieve e.g. that a pointing gesture is illustrated using the displayed line, which shifts from the image of the index finger of an operating person successively to the display surface, by it being extended virtually, as it were.

It is possible with the second and third aspects of the invention in particular to achieve the object which has already been mentioned in the introductory part of making a contribution for making available a graphical operating interface for a user that offers easy and secure operation of electronically controlled devices.

Proposed by way of the second and third aspects of the invention are in particular concepts for gesture control of electronic display apparatus which can be embodied and/or used for example as furniture for buildings or apartments and can in particular comprise augmented reality functions. The respective gestures of a user can be detected here using any suitable sensor systems. If a specific gesture type or possibly even early gesture movements, for example the beginning of a swiping movement, are recognized by the display apparatus, preferably a piece of information that is matched to the gesture is displayed on the display element. In particular, the respectively displayed reflected image of the object can be superposed with the image of at least a further, virtual object, such as a knob/pushbutton displayed in the form of a graphic, such that the user can interact by way of their gesture directly with the respective virtual object. At least one display parameter, such as position, size, color etc. of the virtual object, can here be matched to one or more parameters of the object that is displayed in reflected form, such as the posture and position of a user, such that the presentation of the virtual object and possibly the change thereof (e.g. movement) from the respective viewing angle of the user adapts to the parameters thereof, such as e.g. movements.

The superposition of the respective images or graphical elements can be effected by way of typical image processing techniques, such as by providing corresponding presentation planes which are assigned in object-wise fashion and/or 3D projection algorithms. Hereby, in particular an approximately realistic presentation of gestures and the interaction thereof with the virtual object can be effected.

It is also advantageously possible, in particular using visual feedback of the display apparatus, to perform complex operating procedures on electronic systems, such as for example the navigation through extensive operating menus, and to avoid operation mistakes thereby.

According to the invention, an operating device can also be specified, in particular for operating an electronically controlled device. It can comprise in particular a display apparatus described in this document.

Other objects, advantages and novel features of the present invention will become apparent from the following detailed description of one or more preferred embodiments when considered in conjunction with the accompanying drawings.

BRIEF DESCRIPTION OF THE DRAWINGS

Across the figures, respectively identical elements are presented with identical reference signs.

DETAILED DESCRIPTION OF THE DRAWINGS

Figure 1:
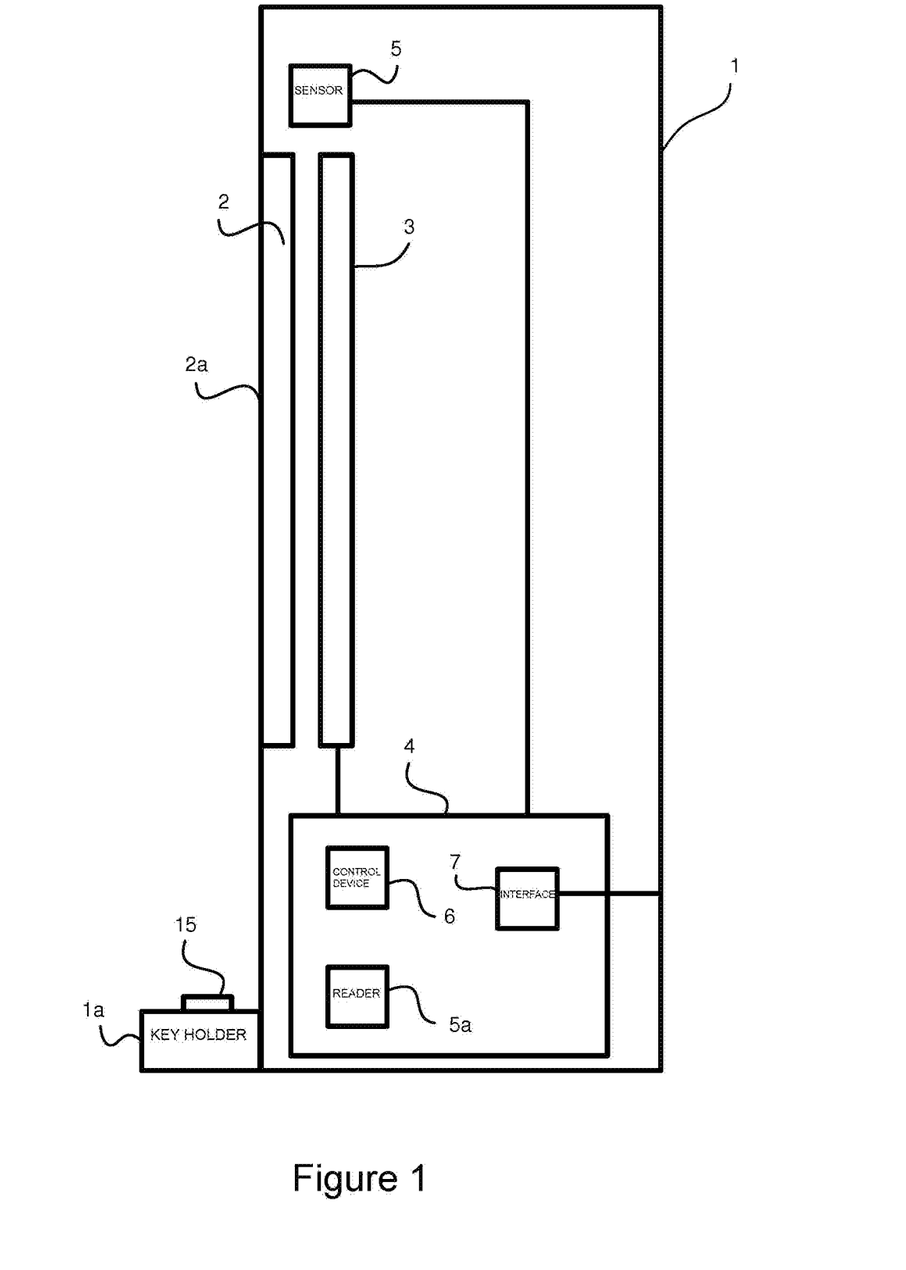
FIG. 1 shows a display apparatus.

The display apparatus 1 presented in FIG. 1 in the form of a wall mirror comprises, on the left front side thereof, a planar mirror 2, which is semi-transparent for light rays that are incident on the mirror surface 2a from the left, for example with a reflectance of 70%.

The display apparatus 1 additionally has an electronically actuable display element 3, in the form of an LED display, located (on the right) behind the mirror 2 or on the surface of the mirror 2 that is opposite the mirror surface 2a. Provided for actuating the display element 3 is an electronic controller 4, which comprises a microprocessor 6 on which a computer program runs. Furthermore provided is a sensor 5 in the form of an optical camera, with which items which are located on the left of (in front of) the mirror 2 are recognizable. The respective recognition can be effected in the camera 5 itself and/or using the control device 6 and in particular using the computer program running thereon. Via a data interface 7, the display apparatus 1 can be connected to external data sources and can in particular be connected via an entirely or partially wire-bound and/or wireless network connection to the Internet and/or exchange data with a vehicle controller and/or with controllers for devices provided on buildings, such as e.g. a heating system or electrical garage door drive.

Using an RFID reader 5a of the controller 4, the display apparatus 1 can recognize for example whether a radio key 15 for a vehicle is placed directly in front of it on a key holder 1a and/or is moved away therefrom. If the radio key 15 is merely placed there, data relating to the vehicle status such as fill level of the gas tank, battery state of charge, internal temperature, etc. are displayed. When the radio key 15 is moved away from the key holder 1a, this is recognized in the controller 4 as a sign that a person moving the radio key 15 has a mobility requirement. The controller 4 therefore ascertains based on further camera signals whether a person is situated in front of the display apparatus and investigates whether data relating to the person are available so as to identify said person and make available or access any current profile data of the person. The controller 4 retrieves data via the interface 7 from at least one data source and actuates the display element 3 such that mobility-related data or information in the form of text, numbers, graphics, etc. are displayed. At the same time, virtual operating elements can be displayed, with which the display and/or further actions can be controlled by the detected person (the user) of the display apparatus.

Via the interface 7, in particular a connection of the controller 4 to the Internet can be established and hereby to a multiplicity of data sources for retrieving data. Here, for example by transmitting corresponding secure access data, it is also possible to access appointment information for the recognized person from a personal calendar of the person and to display them on the display element 3. In accordance with the appointment information, in particular with respect to location, time and/or appointment partner, and possibly information, provided by the interface 7, relating to various means of transport and/or vehicles, a recommendation can be calculated in the controller 4 and output as to which transport means or which plurality of intermodal transport means the person should use to get to the appointment. The calculation is variably controllable using parameters, such as "as early as possible," "on time if possible" or "with as few means of transport as possible." If it should be established, with evaluation of at least one cost parameter, e.g. the calendar and/or current locations of several appointment partners, by way of specifiable parameters that it is more efficient, e.g. with respect to travel times and/or energy consumption, for the partners to meet at a different location and/or at a different time, a corresponding recommendation relating to a postponement or relocation of the appointment can be output to at least one of the persons or to at least one of the communication systems and/or display apparatuses used by the person.

The position of the mobility-based information displayed on the display element 3 can be controlled in particular such that it does not superpose, from the view of the using person, with the reflected image displayed in the mirror 2. Corresponding control is performed here on the basis of the position (in particular distance and angle) of the eyes of the person ascertained by the camera 5 relative to the mirror surface 2a and takes into account the basic optical laws of reflection.

The controller 4 can be set up in particular for calculating, on the basis of sensor signals of the camera 5 and/or of further sensors, the position of the respective graphical elements (selection fields, lines, images, e.g. of a body part of the user) on the display element 3 such that from the view of the user of the display apparatus 1 standing in front of it, they do not superpose with the reflected image of said user, and/or a fictitious element such as a fictitious line between a body part of the user performing a gesture and a graphical element, in particular a selection field, is displayed on the display element 3 such that the line, from the viewing angle of the user, extends from the reflected image of the body part as accurately as possible to the graphical element.

Herefor, in particular triangulation algorithms can be used in the controller and/or parallax effects can be taken into account.

Figure 2:
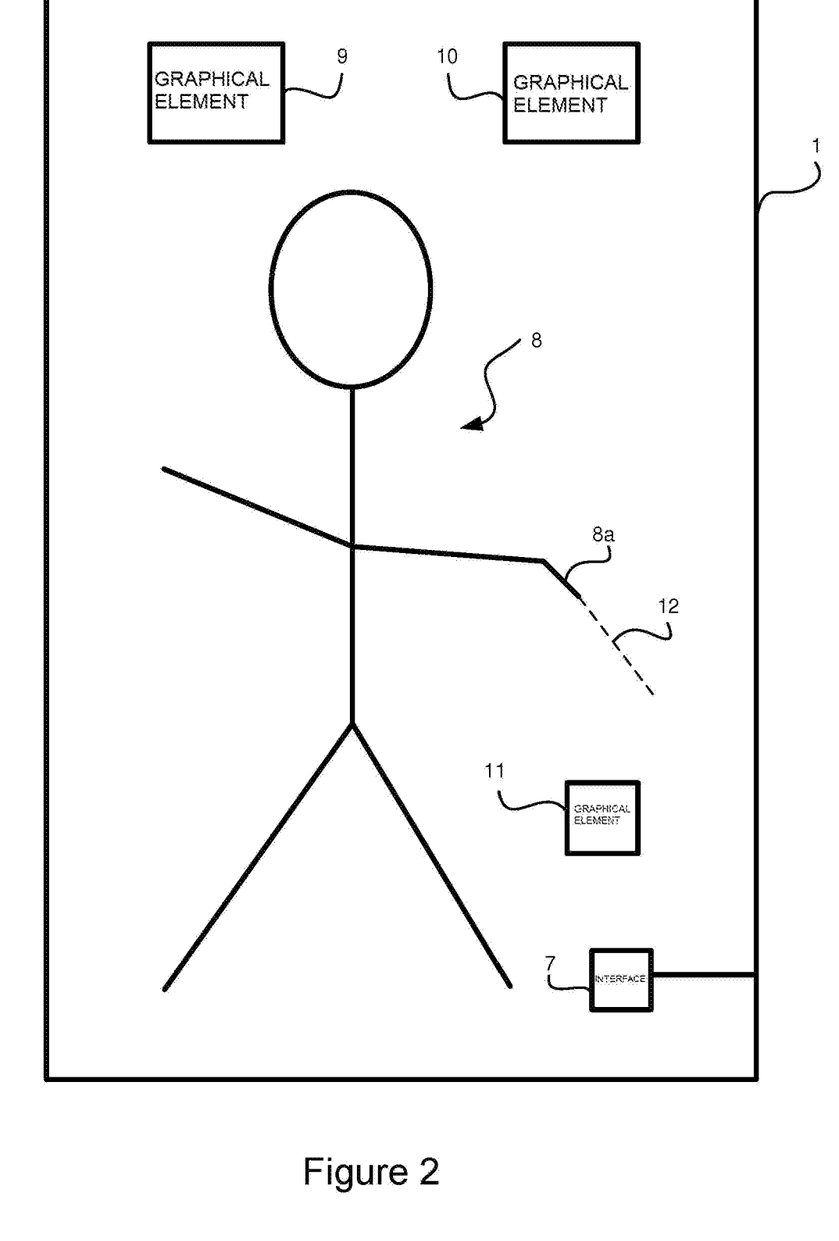
FIG. 2 shows graphical elements shown in addition to a reflected image.

FIG. 2 shows the display apparatus 1 from FIG. 1, as can be used for example in an operating unit. By way of the interface 7, operating commands or parameters can be output to an external control system. However, as described in FIG. 1, it is also possible via the interface 7 to retrieve data from external data sources. The schematically drawn reflected image 8 of a user who is situated in front of the display apparatus 1 is displayed. Outside a region in which the reflected image 8 is situated, here the silhouette of the reflected image 8, graphical elements 9, 10 with additional information retrieved for example from the external data sources are displayed in corresponding regions of the display element 3—controlled by the controller 4—neither such that they border nor overlap the reflected image 8. Furthermore provided by an external control system (not shown here) and displayed by the display apparatus 1 is a graphical element 11 which forms a virtual operating element, which is operable by way of a gesture, for the external control system. In the situation shown in FIG. 2, the imaged user/operator 8 is in the process of moving their index finger, represented by way of the reflected image 8a thereof, in the direction of the virtual operating element 11. This is displayed to the operator via the line 12. In the continuation, the line would be displayed as becoming longer, and its end that is remote from the finger 8a would move, following the pointing gesture, in the direction of the virtual operating element 11.

Figure 3:
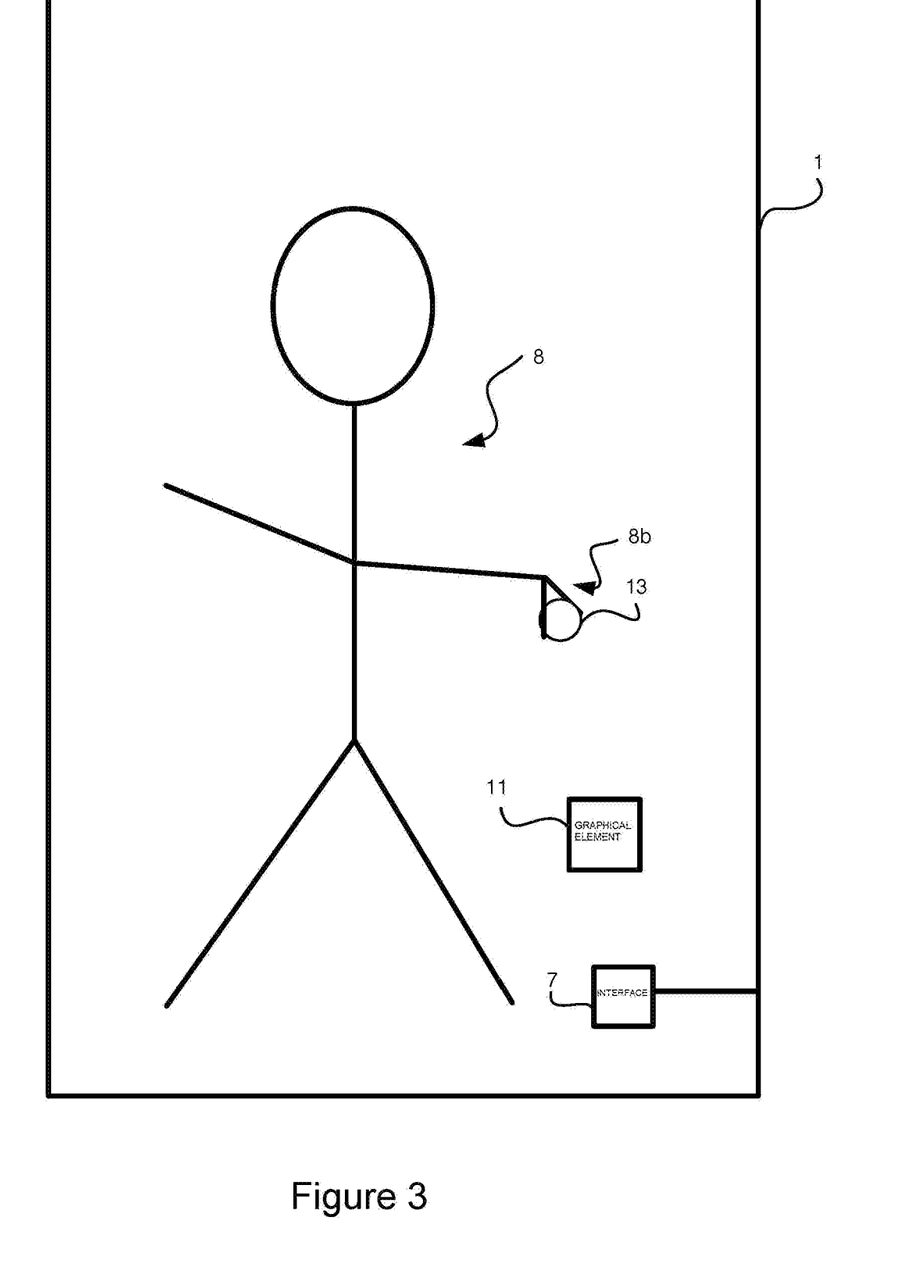
FIG. 3 shows a graphical element that is superposed with a reflected image.

FIG. 3 schematically shows how a graphical element 13 as a symbol for a knob/pushbutton is superposed with the reflected image 8b of the right hand of the user such that reliable operation of the external control system by way of the virtual knob/pushbutton 13 is possible.

The described devices and system components are controlled in particular with computer programs and to this end can include further elements, known per se, of computers and digital control devices such as a microprocessor, volatile and non-volatile memories, interfaces etc. The invention can therefore also be implemented entirely or partially in the form of a computer program product, which, upon loading and execution on a computer, entirely or partially effects a process in accordance with the invention. It can be provided, for example, in the form of a data carrier such as a CD/DVD or in the form of one or more files on a server, from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display apparatus, comprising:
    an electronically actuable display element for graphical displays;
    a mirror unit, by way of which an object that is located within a specified region of the environment of the display apparatus is presented in reflected form;
    a sensor, which captures the position of the object within the specified region; and
    a controller, which controls the position of at least one graphical element on the display element on the basis of the captured position of the object, wherein
    the sensor captures a user of the display apparatus as the object in the specified region of the environment of the display apparatus, and the mirror unit displays a reflected image of the user,
    the controller is configured such that a virtual graphical element is dynamically displayed on the display element, the virtual graphical element extending, from a viewing angle of the user, from the reflected image of a body part of the user, the body part used to perform a gesture to operate a control system, to a graphical operating element that is displayed on the display element, thereby allowing the user to interact with the graphical operating element; and
    a distance between the body part of the user performing the gesture and the display is indicated by visual feedback on the graphical operating element.

2. The display apparatus as claimed in claim 1, wherein the display apparatus is set up to recognize the detected object, and/or determine a silhouette of the object, based on data obtained using the sensor and/or at least one further sensor.

3. The display apparatus as claimed in claim 1, wherein the controller is configured such that, from a viewing angle of the object, the displayed graphical element does not superpose with the displayed reflected image of the object.

4. The display apparatus as claimed in claim 1, wherein the controller is configured such that displayed on the display element is at least one graphical input element which at least partially overlaps and/or borders the reflected image of the user.

5. The display apparatus as claimed in claim 1, further comprising:
    a microprocessor and a memory for storing a computer program running on the microprocessor, configured for selectively retrieving data via an interface from a data source and actuating the display element using the retrieved data.

6. An operating device, comprising a display apparatus as claimed in claim 1.

7. The operating device as claimed in claim 6, wherein the operating device is configured to output control data to a vehicle or to a controller of the vehicle.

8. The operating device as claimed in claim 7, wherein the operating device is configured to output control data to a non-vehicular electronic controller.

\* \* \* \* \*